US008118231B2

(12) United States Patent
Vast et al.

(10) Patent No.: US 8,118,231 B2
(45) Date of Patent: Feb. 21, 2012

(54) SECURITY STRUCTURE AND ARTICLE INCORPORATING SUCH A STRUCTURE

(75) Inventors: Nathalie Vast, Mont Saint Eloi (FR); Stephane Mallol, Provins (FR)

(73) Assignee: Arjowiggins Security, Issy les Moulineaux (FR)

( * ) Notice: Subject to any disclaimer, the term of this patent is extended or adjusted under 35 U.S.C. 154(b) by 827 days.

(21) Appl. No.: 11/666,864

(22) PCT Filed: Oct. 26, 2005

(86) PCT No.: PCT/FR2005/050903
§ 371 (c)(1), (2), (4) Date: Sep. 16, 2008

(87) PCT Pub. No.: WO2006/051231
PCT Pub. Date: May 18, 2006

(65) Prior Publication Data

US 2009/0008458 A1 Jan. 8, 2009

(30) Foreign Application Priority Data

Nov. 8, 2004 (FR) .................................... 04 52558

(51) Int. Cl.
*G06K 19/06* (2006.01)

(52) U.S. Cl. ....................................... 235/491; 235/486

(58) Field of Classification Search .................. 235/491, 235/488, 486, 487, 380, 375
See application file for complete search history.

(56) References Cited

U.S. PATENT DOCUMENTS

| | | | | |
|---|---|---|---|---|
| 7,932,502 | B2 * | 4/2011 | Kubo et al. | 250/458.1 |
| 2004/0232851 | A1 * | 11/2004 | Roach et al. | 315/160 |
| 2005/0073258 | A1 * | 4/2005 | Jang et al. | 313/634 |
| 2005/0120907 | A1 * | 6/2005 | Aoyama et al. | 106/31.15 |
| 2006/0240286 | A1 * | 10/2006 | Park et al. | 428/690 |
| 2007/0217222 | A1 * | 9/2007 | Jung et al. | 362/614 |
| 2009/0008666 | A1 * | 1/2009 | Otsuka et al. | 257/98 |
| 2010/0020290 | A1 * | 1/2010 | Kemp et al. | 353/31 |

FOREIGN PATENT DOCUMENTS

| | | | |
|---|---|---|---|
| DE | 199 36 030 | A1 | 2/2001 |
| EP | 0 319 157 | A2 | 6/1989 |
| EP | 0 435 029 | A2 | 7/1991 |
| EP | 1 036 665 | A1 | 9/2000 |
| FR | 2 593 840 | | 8/1987 |
| GB | 2 300 596 | A | 11/1996 |
| WO | WO 03/054259 | A1 | 7/2003 |
| WO | WO 03/061980 | A1 | 7/2003 |

* cited by examiner

*Primary Examiner* — Thien M Le
(74) *Attorney, Agent, or Firm* — Oliff & Berridge, PLC

(57) ABSTRACT

A security structure intended to be incorporated or fastened, at least partially, in or on an article, for example a security document and/or a document of value, includes at least one first fluorescent zone capable of emitting by fluorescence, under a predefined illumination condition, visible light of a first color; and at least one second fluorescent zone capable of emitting by fluorescence, under the predefined illumination condition, visible light of a second color that differs from the first, the first and second fluorescent zones being observable from the respective opposed faces of the structure.

41 Claims, 4 Drawing Sheets

Fig.1
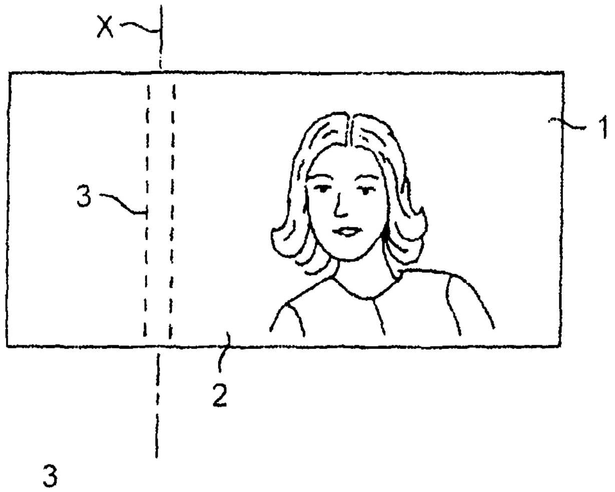
Fig.2
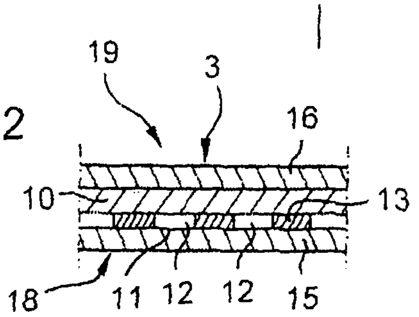
Fig.3
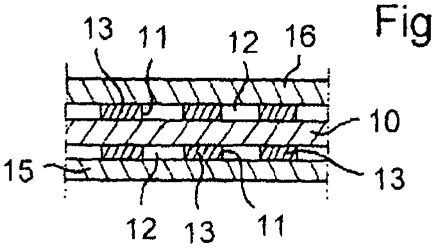
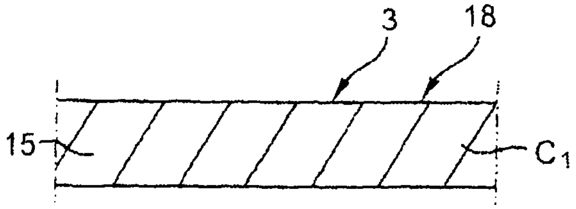
Fig.4
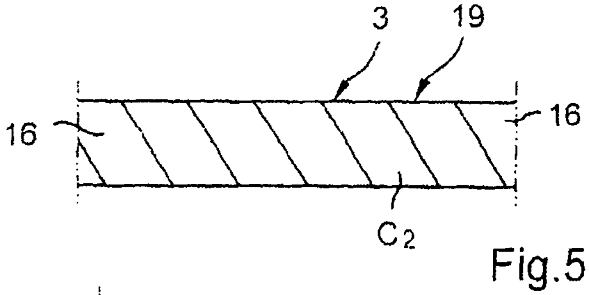
Fig.5
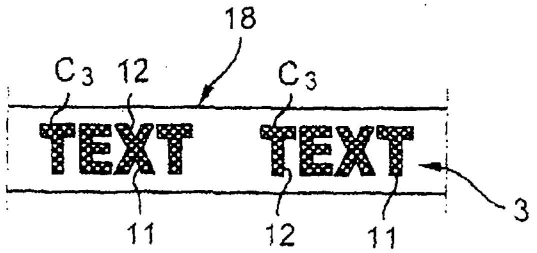
Fig.6
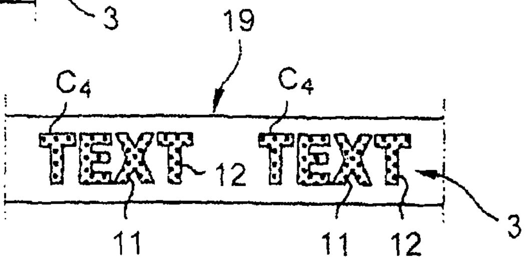
Fig.7

Fig.14
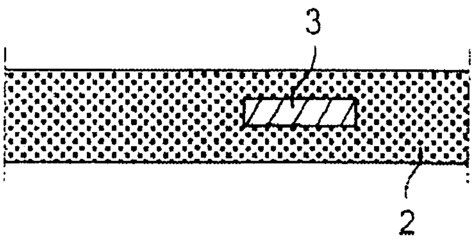
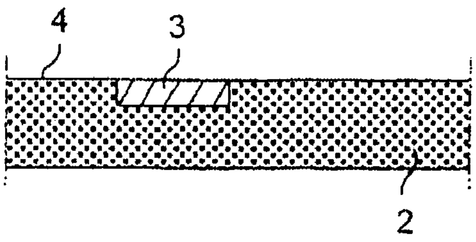
Fig.15
Fig.16
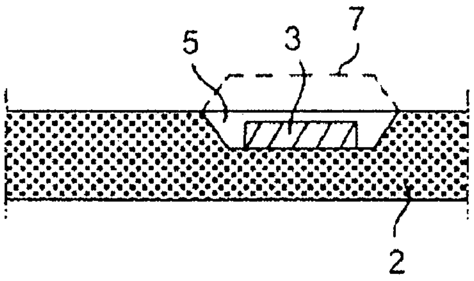
Fig.17
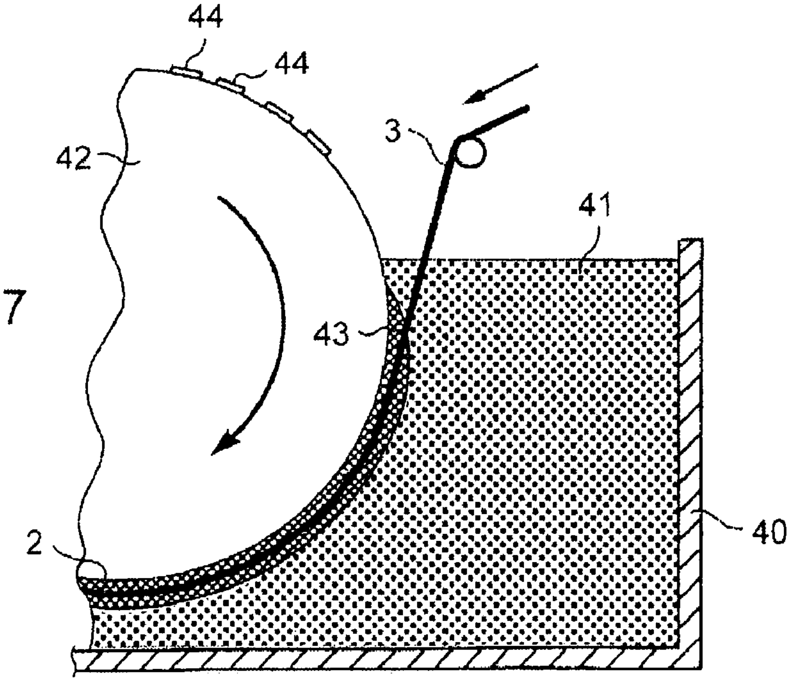

SECURITY STRUCTURE AND ARTICLE INCORPORATING SUCH A STRUCTURE

BACKGROUND

The subject of the present invention is in particular a security structure and an article incorporating such a structure.

Patent EP-B1-0 319 157 teaches a document of value, such as a banknote, incorporating a demetallized security thread, it being possible for the thread to contain a fluorescent material.

SUMMARY

There is a need to further improve the protection of security documents and/or documents of value from falsification.

The aim of the present invention is in particular to meet this need.

The subject of the invention is, according to one of its aspects, a security structure intended to be incorporated or fastened, at least partially, in or on an article, for example a security document and/or a document of value, the structure comprising:

- at least one first fluorescent zone capable of emitting by fluorescence, under a predefined illumination condition, visible light of a first color; and
- at least one second fluorescent zone capable of emitting by fluorescence, under the predefined illumination condition, visible light of a second color that differs from the first, the first and second fluorescent zones being observable from the respective opposed faces of the structure.

Thus, under the predefined illumination conditions, the color of the structure may vary from one face to the other, the structure for example appearing at least partially blue on one face and at least partially yellow on the other. Authentication and/or identification of an article comprising such a structure may thus involve two observation steps from the two respectively opposed faces of the article. This increases the level of protection of the article against falsification.

Furthermore, the invention makes it possible, owing to the presence of fluorescent zones of different colors, to create novel optical effects.

The predefined illumination condition may correspond to ultraviolet illumination, in particular with a wavelength close to the visible, for example about 365 nm. As a variant, the predefined illumination condition corresponds to infrared illumination.

In one exemplary embodiment of the invention, at least one of the first and second fluorescent zones, in particular both, are substantially colorless in white light and/or at least partially nonopaque, at least under the predefined illumination condition.

Advantageously, the first and second fluorescent zones are superposed at least partially so that, under the predefined illumination condition, the superposition of the two fluorescent zones appears, in transmitted light, as a third color that differs from the first and second colors.

Thus, authentication and/or identification of an article or document incorporating such a structure may include, in addition to two observation steps under the predefined illumination condition, so as to observe, in reflection, the first and second colors, at least one observation step in transmitted light in order to observe the third color.

Advantageously, the first and second fluorescent zones have absorption spectra chosen so that, under the predefined illumination condition, their superposition appears, in transmitted light, as a third or fourth color that differ from the first and second colors, depending on the order of the fluorescent zones through which the incident light passes.

The difference ΔE between the third and fourth colors, in the 1976 CIE calorimetric space (L*C*h), may be at least 2, in particular at least 5, thereby making this difference readily observable.

Authentication and/or identification of an article or document may thus involve detecting four different colors. This further enhances the security.

For example, under UV illumination, the first fluorescent zone appears yellow and the second fluorescent zone appears blue in reflection, while when observed in transmitted light the structure has a violet color when it is observed from a first face and appears substantially white when it is observed from a second face, opposite the first.

The colors and their number may differ from those described above.

As a variant, the first and second fluorescent zones have absorption spectra chosen so that, under the predefined illumination condition, the superposition of the two fluorescent zones appears, in transmitted light, to have substantially the same color irrespective of the side of observation.

In one exemplary embodiment of the invention, the structure comprises at least one third fluorescent zone observable on the same face as the first fluorescent zone, having a color that differs from the first fluorescent zone under the predefined illumination condition.

Advantageously, the structure comprises:

- at least one third fluorescent zone appearing in said second color under the predefined illumination condition, the first and third zones being observable from a first face of the structure; and
- at least one fourth fluorescent zone appearing in said first color under the predefined illumination condition, the second and fourth zones being observable from a second face of the structure, on the opposite side from the first, each fluorescent zone on one face being at least partially, preferably substantially exactly, superposed with a fluorescent zone of different color on the other face.

When the order of superposition of the fluorescent zones is not without effect on the result produced when observing the structure in transmitted light, what may be observed on each face of the structure, in transmitted light, under the predefined illumination conditions, is an alternation of fluorescent zones appearing in the third and fourth colors respectively. Thus, irrespective of from which side the face is observed, the structure has overall the same appearance under the predefined illumination condition. This may facilitate authentication and/or identification.

Preferably, the third fluorescent zone, or the fourth fluorescent zone, is adjacent the first zone, or adjacent the second zone respectively, these zones preferably being substantially exactly superposed. Advantageously, the structure is nonopaque in a joining region between the first and third fluorescent zones, or second and fourth fluorescent zones, respectively.

Such a structure offers enhanced security against falsification insofar as a defect in the arrangement of the fluorescent zones can be detected relatively easily. This is because when the fluorescent zones on the opposed faces of the structure are exactly superposed, when the structure is observed by holding it up to the light, under the predefined illumination conditions, only one or two colors are revealed. However, when fluorescent zones on the opposed faces are not superposed exactly and overlap onto neighboring fluorescent zones, other colors are revealed.

In one exemplary embodiment of the invention, the structure has at least one entirely fluorescent face, in particular two opposed entirely fluorescent faces. As a variant, the structure has at least one entirely fluorescent face, in particular two opposed entirely fluorescent faces, comprising for example fluorescent zones alternating with nonfluorescent zones.

In one exemplary embodiment of the invention, the structure comprises a support which is at least partially, in particular entirely, transparent or translucent and bears the fluorescent zones. The support may be flexible, in particular being made of a plastic, for example a polyester.

At least one of the fluorescent zones may be formed by depositing a fluorescent composition on one face of the support.

Preferably, the structure, for example the support, comprises at least first and second adjacent portions, the first portion having a greater aptitude to opposing the passage of light, under a given illumination, than that of the second portion.

The first portion may be substantially opaque and/or reflective, at least under the predefined illumination condition, for example under UV illumination and/or under ambient illumination.

The second portion may be substantially transparent and/or translucent at least under the predefined illumination condition, for example under UV illumination and/or at least under ambient illumination.

Preferably, the second aforementioned portion is at least partially superposed with at least one fluorescent zone or, as the case may be, with the superposition of two fluorescent zones so that, under the predefined illumination condition, in transmitted light, the second portion appears with a color corresponding to the fluorescent zone or to the superposition of the fluorescent zones.

In one exemplary embodiment of the invention, the second portion has a shape chosen so as to define a pattern, which appears, in transmitted light, lighter than adjacent regions of the structure.

The second portion may, where appropriate, be entirely surrounded by the first.

In another exemplary embodiment of the invention, the first portion has a form chosen so as to define a pattern, which appears, in transmitted light, darker than adjacent regions of the structure.

The first portion may, where appropriate, be entirely surrounded by the second.

The pattern may be chosen from one of the following elements: a letter, a drawing, a symbol, a logo, this list not being exhaustive.

In one exemplary embodiment of the invention, the aforementioned first portion is formed by a metal layer, in particular a metal coating, and the afore-mentioned second portion is formed by demetallizing this layer.

As a variant, the structure includes printing, in negative or positive, with an ink, the first portion having the ink and the second portion having no ink.

Advantageously, the aforementioned second portion and the fluorescent zone at least partially covering it are nonopaque in white light so as to allow, in ambient light, when the article is held up to the light, to see patterns present on the structure, thus offering additional security.

The invention thus makes it possible to have, for a document, the following levels of security:

- first level: observation in ambient light, when the document is held up to the light, of the one or more second portions, with recognition of the corresponding one or more patterns;
- second level: observation of fluorescent zones, by reflection, under the predefined illumination condition; and
- third level: observation, in transmitted light, under the predefined illumination condition, of the one or more second portions, with recognition of the one or more patterns and, where appropriate, of colors formed by the superposition of the fluorescent zones.

Advantageously, the second portion extends over a joining region between adjacent aforementioned first and third fluorescent zones, or adjacent second and fourth fluorescent zones, respectively.

The first aforementioned opaque and/or reflective portion may optionally include a composition that may or may not contain fluorescent dyes or pigments.

In one exemplary embodiment of the invention, the aforementioned first and second portions form a plurality of patterns or groups of patterns that repeat, in a regular or random fashion, along a predetermined direction.

In order for the protection to be further enhanced, the structure may include one of the following elements:

- an electronic chip;
- a holographic or diffractive element;
- a magnetic or crystalline coating;
- liquid crystals;
- printing with a varnish;
- a marker, in particular a biological, mineral or synthetic marker;
- a luminescent ink or substance;
- a thermochromic and/or piezochromic pigment.

The structure may take various forms, for example in the form of a strip, and constitute for example a security thread. The structure may have for example a width of at least 0.7 mm but preferably less than 60 mm, in particular between 1 mm and 40 mm.

In an exemplary embodiment of the invention, the structure is designed to be entirely incorporated into or onto the security article and/or article of value.

As a variant, the structure comprises a support forming a carrier strip designed to be separated from at least one fluorescent layer after the structure has been applied on an article, in particular a security document and/or a document of value, it being possible for the structure to include, where appropriate, between the support and the fluorescent layer, at least one release layer. The structure may constitute for example a security patch.

The subject of the invention is also, according to another of its aspects, an article, for example a security document and/or a document of value, comprising a security structure as mentioned above.

The structure may be at least partially embedded in a layer of the article and comprise, for example, alternately zones embedded in a layer of the article and exposed portions. As a variant, the structure may be flush with one face of the article or may be entirely embedded in it.

The article may include, in contact with the structure, at least one fibrous layer containing, for example, paper fibers, in particular cellulose fibers, and/or synthetic fibers.

As a variant, the article may include, in contact with the structure, at least one nonfibrous layer, for example made of plastic.

In one exemplary embodiment of the invention, the security structure extends from a first edge of the article to a second edge, opposite the first.

The article may be intended to receive printing, especially to form a document.

The article may be intended to constitute one of the following elements: a banknote; a security paper; a passport sheet or cover; a visa; a coupon; a document of value other than a banknote, for example a check or a credit card; a protective and/or authenticating label; a traceability label; an optical disc; a ticket.

Preferably, the article includes, in line with the fluorescent zones, a region that is sufficiently transparent and/or translucent for at least one portion of the fluorescent zones to be visible through said region when the article is observed by holding it up to the light.

The aforementioned region may for example correspond to an aperture in the article or to a layer of at least one transparent and/or translucent material.

Yet another subject of the invention, according to another of its aspects, is a method of manufacturing an article, which includes the following steps:

provision of a structure as mentioned above, at least partial incorporation or transfer of the structure into or onto the article.

When the article includes a fibrous layer, the method may include the following steps:

formation of the fibrous layer by depositing fibers on a surface immersed in a dispersion of fibrous material; and contacting of the structure with the fibrous layer being formed.

As a variant, the method may include the following steps:

contacting of one face of an article with a support for at least one fluorescent layer;

transfer of the fluorescent layer; and after transfer, separation of the support from the fluorescent layer.

Yet another subject of the invention, according to another of its aspects, is a method of authenticating and/or identifying an article, comprising a structure as defined above, the method including the following steps:

the article is exposed to the predefined illumination condition; and the authenticity and/or identity of the article is checked on the basis of the color or colors revealed by the fluorescent zones.

When the first and second fluorescent zones are non-opaque, observable from opposite sides of the structure and at least partially superposed, the method advantageously comprises the following steps:

observation of the first fluorescent zone in reflected light, under the predefined illumination condition;

observation of the second fluorescent zone in reflected light, under the predefined illumination condition;

observation of the structure in transmitted light, under the predefined illumination condition; and verification of the authenticity and/or identity of the article on the basis of the colors observed in the above steps.

When the first and second fluorescent zones have absorption spectra chosen so that, under the predefined illumination condition, light passing in succession through the two fluorescent zones has third and fourth colors, which differ from the first and second colors, depending on the order of the fluorescent zones through which the incident light passes, the method advantageously comprises the following steps:

observation of the structure in transmitted light, under the predefined illumination condition, from a first face of the article;

observation of the structure in transmitted light, under the predefined illumination condition, from a second face of the article, opposite the first; and verification of the authenticity and/or identity of the article on the basis of the colors observed in the above steps.

BRIEF DESCRIPTION OF THE DRAWINGS

The invention will be better understood on reading the following detailed description of nonlimiting exemplary embodiments of the invention and on examining the appended drawing in which:

FIG. 1 shows, schematically and partially, an example of an article produced in accordance with the invention;

FIGS. 2 and 3 show, schematically and partially, in cross section, the structure incorporated into the article of FIG. 1, in accordance with two exemplary embodiments of the invention;

FIGS. 4 to 13 show, schematically and partially, other exemplary embodiments of the structure;

FIGS. 14 to 16 show, schematically and partially, in cross section, articles respectively conforming to various exemplary embodiments of the invention;

FIG. 17 illustrates schematically one step of a method of manufacturing the article of FIG. 1;

Figure 8:
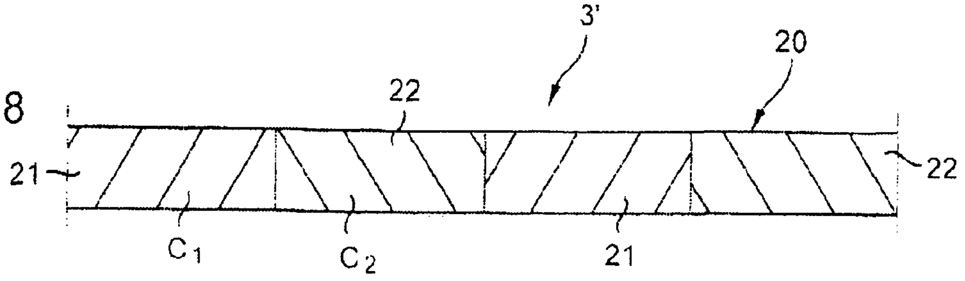

In the drawing, for the sake of clarity, the relative proportions of the various elements shown have not always been respected, the views being schematic.

DETAILED DESCRIPTION

FIG. 1 shows an article 1, for example a banknote, which includes a fibrous layer 2 in which a security structure 3 according to the invention is incorporated.

The article 1 may also constitute a security paper, a passport sheet or cover, a visa, a coupon, a document of value other than a banknote, for example a check or a credit card, a protective and/or authenticating label, a traceability label or an optical disk.

The article 1 may, where appropriate, consist of the structure itself, for example in the case of a plastic banknote.

The structure 3, in the example considered, takes the form of a band of longitudinal axis X, with a width less than that of the article 1, being for example about 15 mm or less.

The structure 3 may be completely embedded in the article 1, as may be seen in FIG. 14. As a variant, as illustrated in FIG. 15, the structure 3 is flush with one face 4 of the article. Again as a variant, as illustrated in FIG. 16, the structure 3 is partially embedded in the fibrous layer 2 so as to have alternately embedded portions and exposed portions. For this purpose, the fibrous layer 2 may include recesses 5, allowing portions of the structure 3 to be exposed. Where appropriate, the fibrous layer 2 may include protrusions 7, shown in dotted lines in FIG. 16, located between the recesses 5.

The article 1 may have, where appropriate, apertures that facilitate observation in transmitted light.

The structure 3 includes for example a support 10 made of a transparent plastic, especially a polyester, as illustrated in FIG. 2.

The structure 3 includes a substantially opaque and/or reflective first portion 13 surrounding substantially transparent second portions 12.

In the example considered, the second portions 12 form groups of patterns 11, such as text, as illustrated in FIGS. 6 and 7, which is repeated along the longitudinal direction of the structure 3.

As a variant, the patterns may represent a drawing, a symbol or a logo.

The first portion 13 may be formed by a metal coating and the portions 12 by demetallizing this coating.

As a variant, the first portion 13 is formed by depositing an ink by printing in negative, and the second portions 12 correspond to the zones containing no ink.

The portions 12 and 13 may be produced on only one face of the support 10, as illustrated in FIG. 2 or, as a variant, on both opposed faces of the support 10, as illustrated in FIG. 3.

The support 10 with the portions 13 is covered on at least one of its faces with at least one fluorescent composition.

In the example shown in FIGS. 2 and 3, the support 10 and the portions 13 are covered with fluorescent compositions 15 and 16 which appear, in fluorescence, in a first color $C_1$ and a second color $C_2$ respectively, under a predefined illumination condition, for example under UV illumination, in particular having a wavelength close to 365 nm.

Furthermore, the fluorescent compositions 15 and 16 have absorption spectra chosen so that, under the predefined illumination condition, their superposition appears in a third color $C_3$ or a fourth color $C_4$, which differ from the first and second colors $C_1$ and $C_2$, depending on the order of the fluorescent compositions through which the incident light passes.

The fluorescent compositions 15 and 16 are for example those sold by Honeywell.

The compositions 15 and 16 are nonopaque, so that the second portions 12 can be observed in daylight, when the article is held up to the light.

Various steps for authenticating and/or identifying the article 1 will now be described with reference to FIGS. 4 to 7.

When the article 1 is observed from the face 18 of the structure 3, under the predefined illumination condition, in reflection, the structure 3 appears with the first color $C_1$, as illustrated in FIG. 4.

When observing the article 1 from the opposite face 19, again under the predefined illumination condition, in reflection, the structure 3 appears with the second color $C_2$, as illustrated in FIG. 5.

Under the predefined illumination condition, when the article 1 is observed in transmitted light from the face 18, the portions 12 appear with the third color $C_3$, as may be seen in FIG. 6, while observation from the other face 19, when the article is held up to the light, reveals the portions 12 with the fourth color $C_4$, as illustrated in FIG. 7.

Thus, the article 1 may be authenticated and/or identified by observing four different colors.

In the example that has just been described, the structure 3 has, on each face 18 or 19, a single color under the predefined illumination condition.

It would not be outside the scope of the present invention for the security structure to include fluorescent zones of different colors on each face.

Figure 9:
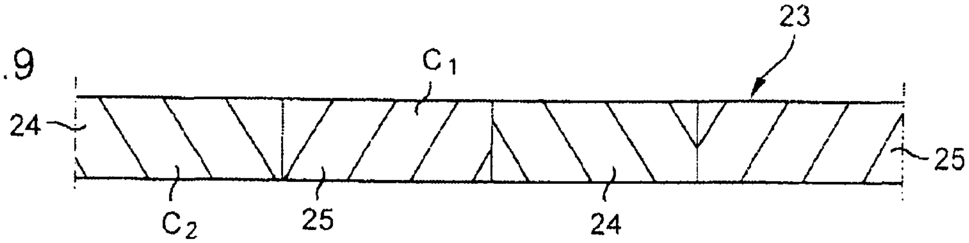

FIGS. 8 and 9 show a structure 3' according to the invention, having on opposed faces 20 and 23 an alternation of adjacent fluorescent zones 21 and 22, and 24 and 25 respectively. The zones 21 and 25, and the zones 22 and 24 respectively, are capable of emitting, by fluorescence, light of a first color $C_1$, and of a second color $C_2$, respectively, under the predefined illumination condition.

In the example considered, the fluorescent zones 21, 22, 24 and 25 are of rectangular shape. Of course, these fluorescent zones may have any other shape, for example trapezoidal.

Each respective zone 21, 22 is superposed exactly with a respective zone 24, 25 on the other face. In the example considered, each pair of fluorescent zones 21, 24 and 22, 25 entirely covers a group of portions 12.

The color $C_3$ or $C_4$ produced by observing, in transmitted light, the fluorescent zones depends on the order in which the light passes through them.

Figure 10:
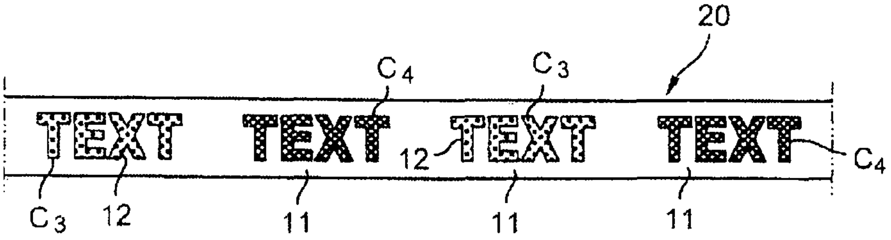
Figure 11:
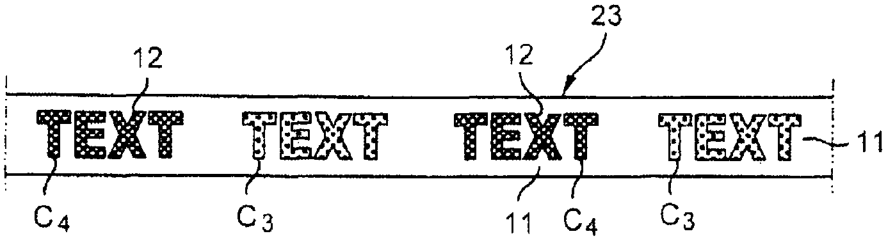

Authentication and/or identification of an article having the structure 3' may thus comprise the following steps:

- the structure 3' is observed from the respective face 20, 23, under the predefined illumination condition, in reflection, so as to detect the alternation of colors $C_1$ and $C_2$ on the respective face 20, 23, as illustrated in FIGS. 8 and 9; and
- the respective face 20, 23 of the structure 3' is observed under the predefined illumination condition, by holding the article up to the light, as illustrated in FIGS. 10 and 11, so as to detect the succession of groups of portions 12 having alternately colors $C_3$ and $C_4$.

Figure 12:
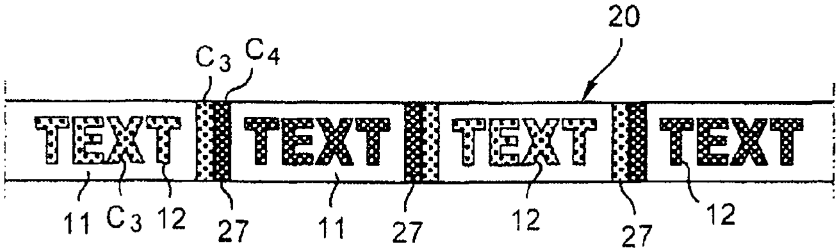

To enhance the security of the structure 3', it is possible to provide, as illustrated in FIG. 12, transparent and/or translucent intermediate portions 27 between two groups of portions 12, these intermediate portions 27 revealing, at least when the article is held up to the light, the join between two respective adjacent fluorescent zones 21 and 22, 24 and 25.

Thus, under the predefined illumination condition, when the structure 3' is observed by holding it up to the light, for example from the face 20, the intermediate portions 27 each have the colors $C_3$ and $C_4$.

It may be seen that, if the fluorescent zones 21, 22 and 24, 25 do not coincide exactly, since for example one of the fluorescent zones 22 is wider than the facing zone 25, the intermediate portion 27 would not only have the colors $C_3$ and $C_4$, but also a portion with the color $C_2$ corresponding to the superposition of the zone 22 with the neighboring zone 24. This means that the structure 3' has been falsified.

Figure 13:
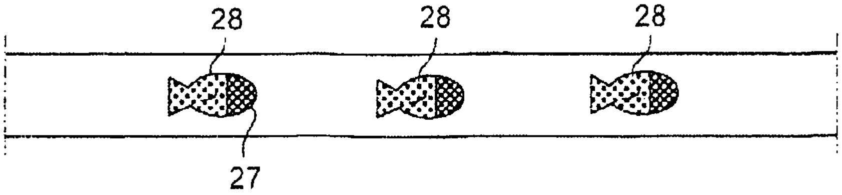
Figure 18:
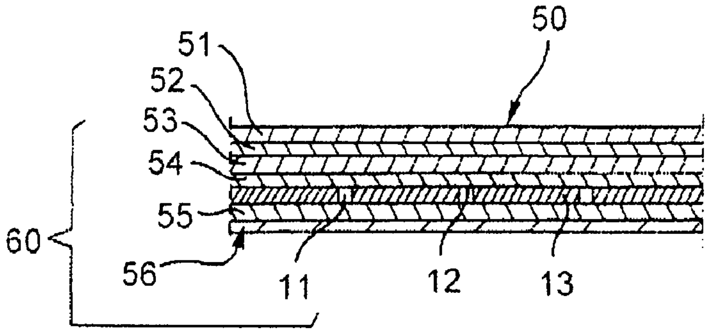
FIG. 18 shows, schematically and partially, in cross section, a security structure according to another exemplary embodiment of the invention.

The intermediate portions 27 may form patterns 28, for example drawings, revealing the join between two respective adjacent fluorescent zones 21 and 22, 24 and 25, as illustrated in FIG. 13.

FIG. 17 shows, schematically and partially, a cylinder mold paper machine.

Figure 19:
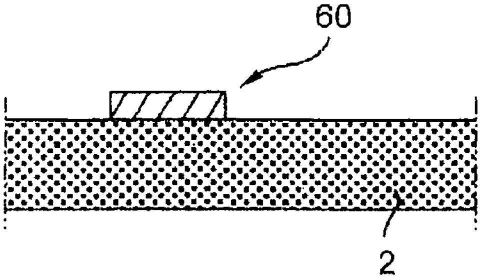
FIG. 19 shows, schematically and partially, in cross section, an article incorporating the structure of FIG. 18.

This machine comprises a tank 40 containing a suspension 41 of fibers, for example cellulose fibers for example onto the surface of the latter, as illustrated in FIG. 19.

Figure 20:
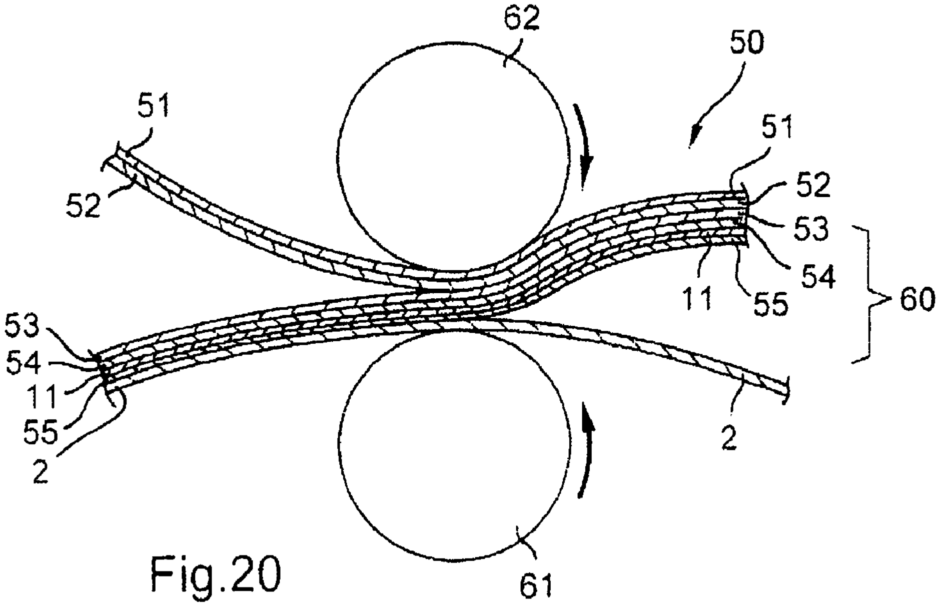
FIG. 20 illustrates, schematically, one step of the method of manufacturing the article of FIG. 19, in accordance with an exemplary embodiment of the invention.

The assembly 60 may in particular be transferred hot onto the fibrous layer 2, as illustrated in FIG. 20.

The layer 2 and the structure 50 are driven in the same direction by means of a machine comprising first 61 and second 62 rotating rolls. After having passed through these rolls, the support 51 and the release layer 52 are separated from the assembly 60, which remains attached on the layer 2.

In the example considered, the layer 2 has a relatively small thickness, making it possible to observe, when the article is held up to the light, the assembly 60 from the opposite face of the layer 2 from the assembly 60.

As a variant, the layer 2 may for example be made in a transparent material, for example a transparent plastic.

Of course, the invention is not limited to the exemplary embodiments described above.

The structure according to the invention may be produced other than in the form of a band, for example in the form of a patch. The structure according to the invention may include compositions exhibiting fluorescence other than in UV, for example in infrared.

The structures 3 and 3' and the foil 50 may include, if so desired, one of the following elements:

an electronic chip;

a holographic or diffractive element;

a magnetic or crystalline coating;

liquid crystals;

printing with a varnish;

a marker, in particular a biological, mineral or synthetic marker;

a luminescent ink or substance;

a thermochromic and/or piezochromic pigment.

Throughout the description, including the claims, the expression "comprising one" or "including one" must be understood to be synonymous with the expression "comprising at least one" or "including at least one", unless specified otherwise.

The invention claimed is:

1. A security structure intended to be incorporated or fastened, at least partially, in or on an article the structure comprising:

at least one first fluorescent zone capable of emitting by fluorescence, under a predefined illumination condition, visible light of a first color; and at least one second fluorescent zone capable of emitting by fluorescence, under the predefined illumination condition, visible light of a second color that differs from the first, the first and second fluorescent zones being observable from the respective opposed faces of the structure, wherein at least one of the first and second fluorescent zones are at least partially nonopaque, at least under the predefined illumination condition, and in that the first and second fluorescent zones are superposed at least partially so that, under the predefined illumination condition, light passing in succession through the two fluorescent zones has a third color that differs from the first and second colors.

2. The structure as claimed in claim 1, wherein the predefined illumination condition corresponds to ultraviolet illumination.

3. The structure as claimed in claim 1, wherein the predefined illumination condition corresponds to infrared illumination.

4. The structure as claimed in claim 1, wherein at least one of the first and second fluorescent zones are substantially colorless in white light.

5. The structure as claimed in claim 1, wherein the first and second fluorescent zones have absorption spectra chosen so that, under the predefined illumination condition, light passing in succession through the two fluorescent zones has third and fourth colors that differ from the first and second colors, depending on the order of the fluorescent zones through which the incident light passes.

6. The structure as claimed in claim 1, wherein the structure comprises at least one third fluorescent zone observable on the face of the first fluorescent zone, having a color that differs from the first fluorescent zone under the predefined illumination condition.

7. The structure as claimed claim 6, wherein the structure comprises:

at least one third fluorescent zone having said second color under the predefined illumination condition, the first and third zones being observable from a first face of the structure; and at least one fourth fluorescent zone having said first color under the predefined illumination condition, the second and fourth zones being observable from a second face of the structure, on an opposite side from the first, each fluorescent zone on one face being at least partially superposed with a fluorescent zone of different color on the other face.

8. The structure of claim 7, wherein each fluorescent zone on one face is exactly superposed with the fluorescent zone of different color on the other face.

9. The structure as claimed in claim 7, wherein the third fluorescent zone, or the fourth fluorescent zone, is adjacent to the first fluorescent zone, or the second fluorescent zone, respectively.

10. The structure as claimed claim 9, wherein the structure is nonopaque in a joining region between the first and third fluorescent zones, or second and fourth fluorescent zones, respectively.

11. The structure as claimed in claim 1, wherein the structure has at least one entirely fluorescent face.

12. The structure of claim 11, wherein the structure has two opposed entirely fluorescent faces.

13. The structure as claimed in claim 1, wherein the structure comprises a support which is at least partially, transparent or translucent and bears the fluorescent zones.

14. The structure as claimed in claim 13, wherein the support is flexible.

15. The structure of claim 14, wherein the support is made of a plastic.

16. The structure as claimed in claim 13, wherein at least one of the fluorescent zones is formed by depositing a fluorescent composition on one face of the support.

17. The structure as claimed in claim 1, wherein the structure comprises at least first and second adjacent portions, the first portion having a greater capability of preventing the passage of light, for a given illumination, than the second portion being substantially transparent and/or translucent, at least under said predefined illumination condition.

18. The structure of claim 17, wherein the first portion is substantially opaque and/or reflective, at least under said predefined illumination condition.

19. The structure as claimed in claim 17, wherein the second portion is at least partially superposed with at least one fluorescent zone.

20. The structure as claimed in claim 17, wherein the second portion has a shape chosen so as to define a pattern.

21. The structure of claim 20, wherein the second portion is entirely surrounded by the first portion.

22. The structure as claimed in claim 17, wherein the first portion has a shape chosen so as to define a pattern, the first portion being entirely surrounded by the second portion.

23. The structure as claimed in claim 22, wherein the pattern is chosen from one of the following elements: a letter, a drawing, a symbol, a logo.

24. The structure as claimed in claim 17, wherein the first portion is formed by a metal layer and the second portion is formed by demetallizing this layer.

25. The structure as claimed in claim 17, wherein the structure includes printing, in negative or positive, with an ink, the first portion having the ink and the second portion having no ink.

26. The structure as claimed in claim 1, wherein it furthermore includes one of the following elements:

an electronic chip;

a holographic and/or diffractive element;

a magnetic or crystalline coating;

liquid crystals;

printing with a varnish;

a marker;

a luminescent ink or substance;

a thermochromic and/or piezochromic pigment.

27. The structure as claimed in claim 1, wherein the structure is in the form of a strip.

28. The structure as claimed in claim 1, wherein the structure has a width of at least 0.7 mm.

29. The structure of claim 28, wherein the width is between 1 mm and 40 mm.

30. The structure as claimed in claim 1, wherein the structure is designed to be entirely incorporated into or onto the security article and/or the article of value.

31. The structure as claimed in claim 1, which includes a support bearing at least one fluorescent layer, wherein the support is configured to be separated from the fluorescent layer after the structure has been applied on a security document and/or document of value.

32. The structure of claim 1, wherein the article is a security document or a document of value.

33. An article at least partially comprising a security structure as defined in claim 1.

34. The article as claimed in claim 33, wherein the structure is at least partially embedded in a layer of the article.

35. The article as claimed claim 34, wherein the structure comprises, alternately, zones embedded in a layer of the article and portions that are exposed.

36. The article as claimed in claim 33, comprising at least one fibrous layer.

37. The article as claimed in claim 33, wherein the security article extends from a first edge of the article to a second edge, opposite the first.

38. The article as claimed claim 33, wherein the article is configured to receive printing.

39. The article as claimed in claim 33, wherein the article is configured to constitute one of the following elements: a banknote; a security paper; a passport sheet or cover; a visa; a coupon; a document of value other than a banknote, for example a check or a credit card; a protective and/or authenticating label; a traceability label; a ticket.

40. A method of manufacturing an article, comprising:

provision of a structure as claimed in claim 1, at least partial incorporation or transfer of the structure into or onto the article.

41. A method of authenticating and/or identifying an article comprising a structure as claimed in claim 1, the method comprising:

exposing the article to the predefined illumination condition; and checking the authenticity and/or identity of the article on the basis of the color or colors revealed by the fluorescent zones.

* * * * *